(12) United States Patent
Wilens

(10) Patent No.: US 10,432,765 B2
(45) Date of Patent: Oct. 1, 2019

(54) SYSTEM, METHOD AND APPARATUS FOR AUGMENTED VIEWING OF REAL WORLD OBJECTS

(71) Applicant: Asher Wilens, Teaneck, NJ (US)

(72) Inventor: Asher Wilens, Teaneck, NJ (US)

(*) Notice: Subject to any disclaimer, the term of this patent is extended or adjusted under 35 U.S.C. 154(b) by 0 days.

(21) Appl. No.: 15/932,034

(22) Filed: Jan. 26, 2018

(65) Prior Publication Data

US 2019/0068765 A1    Feb. 28, 2019

Related U.S. Application Data

(60) Provisional application No. 62/605,703, filed on Aug. 24, 2017.

(51) Int. Cl.
| | |
|---|---|
| H04M 1/02 | (2006.01) |
| G06T 19/00 | (2011.01) |
| H04N 9/31 | (2006.01) |
| G03H 1/04 | (2006.01) |
| G03H 1/22 | (2006.01) |
| G03B 29/00 | (2006.01) |
| H04M 1/21 | (2006.01) |

(52) U.S. Cl.
CPC ............ *H04M 1/0272* (2013.01); *G03H 1/04* (2013.01); *G03H 1/2249* (2013.01); *G06T 19/006* (2013.01); *H04N 9/3173* (2013.01); *G03B 29/00* (2013.01); *G03H 2001/2213* (2013.01); *G03H 2001/2284* (2013.01); *H04M 1/21* (2013.01)

(58) Field of Classification Search
CPC ................................. H04M 1/0272; G03H 1/04
See application file for complete search history.

(56) References Cited

U.S. PATENT DOCUMENTS

| | | | | |
|---|---|---|---|---|
| 2010/0309226 | A1* | 12/2010 | Quack | G06F 16/50 |
| | | | | 345/634 |
| 2011/0248913 | A1* | 10/2011 | Willis | G06F 1/1637 |
| | | | | 345/156 |
| 2013/0147786 | A1* | 6/2013 | Smith | G06T 15/005 |
| | | | | 345/419 |
| 2015/0095683 | A1* | 4/2015 | Kitatani | H04M 1/67 |
| | | | | 713/323 |

* cited by examiner

*Primary Examiner* — Ayodeji O Ayotunde
(74) *Attorney, Agent, or Firm* — Howard Natter; Natter & Natter

(57) ABSTRACT

The present invention is directed to a system, method and apparatus for augmented viewing of real world objects. The invention is thus generally directed to the field of electronic devices, more specifically, electronic devices which project electronic virtual reality displays including, but not limited to, three dimensional holographic images. The invention deploys a cellular phone equipped with a camera and an external framework surrounding the phone. The external framework supports a projector camera projecting a three dimensional holographic image. By such design, either the cellular phone camera or the projection camera can obtain image of an external object and its coordinates in space, then project three dimensional holographic image upon the real world object for artistic, educational and/or marketing purposes.

9 Claims, 5 Drawing Sheets

Double exposure overlay projected on top of the object

Double exposure overlay projected on top of the object

Swivel-knobs to tilt the Y axis and Z axis of the projector's head to properly align overlay 3D-Mesh projected on top of the object properly aligned to detect its physical dimensions Example of AR content projected on the object appears to exist in the context of reality

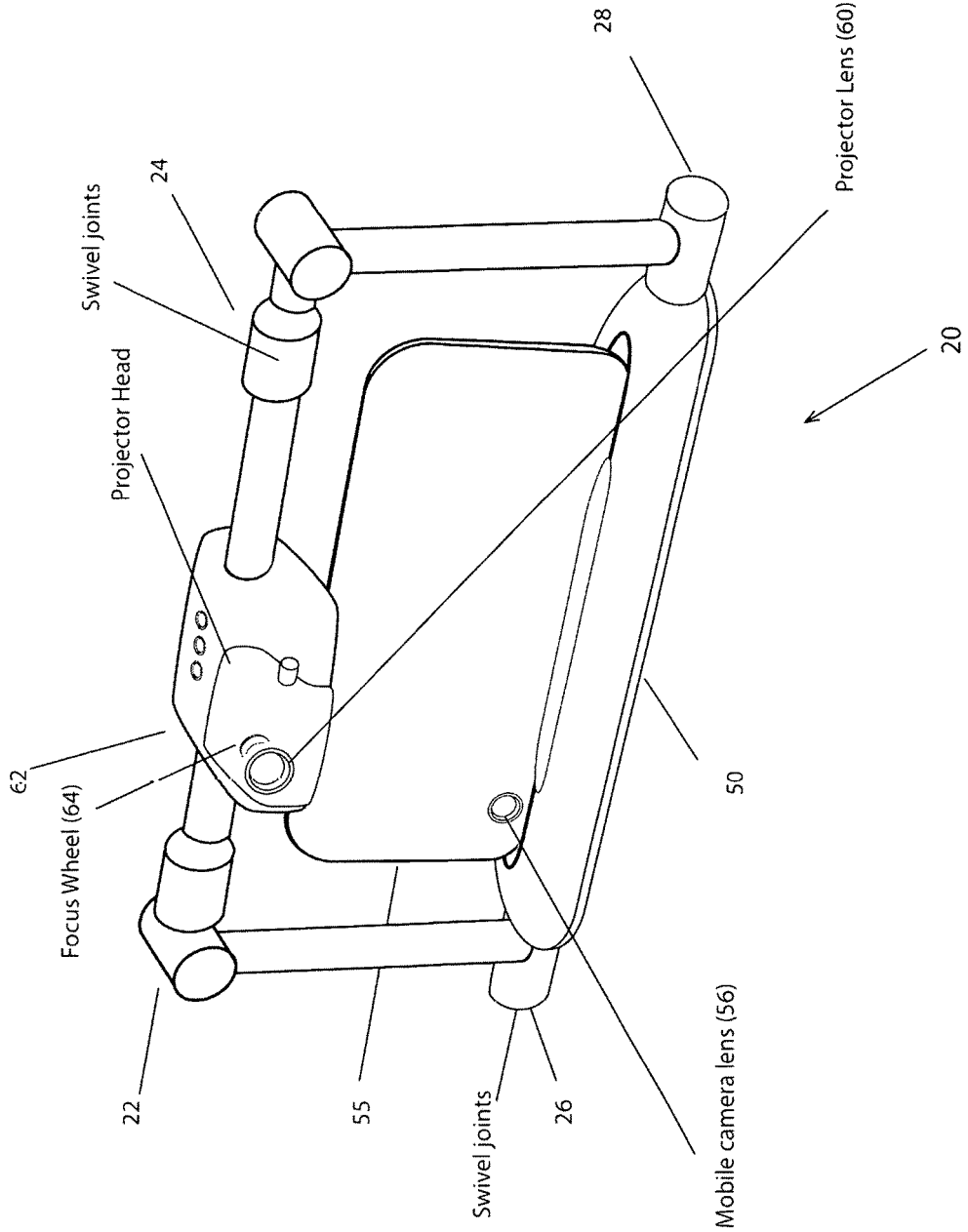

SYSTEM, METHOD AND APPARATUS FOR AUGMENTED VIEWING OF REAL WORLD OBJECTS

PRIORITY

This application claims the benefit under 35 U.S.C. 119(e) of a Provisional U.S. patent application 62/605,703 filed on Aug. 24, 2017, the disclosure of which is hereby incorporated by reference.

BACKGROUND OF THE INVENTION

1. Field of the Invention

The present invention is directed to a system, method and apparatus for augmented viewing of real world objects. The invention is thus generally directed to the field of electronic devices, more specifically, electronic devices which project electronic virtual reality displays including, but not limited to, three dimensional holographic images. The invention is also directed to the field of electronic imaging as overlaid on real world objects, with principles and applications of which may be applied to augmented virtual reality environments and electronic measurement systems.

2. Description of the Related Art

The development of portable cellular telephony has greatly enhanced the ability of users to communicate in both personal and business environments. Since the late 1990s, these developments have expanded beyond the fundamental physical mechanisms which enable cellular telephony, but also include applications and attachments which further extend the basic functionality of a cellular telephone. In addition to cameras, which record images to a memory contained within a cellular telephone, one important and more recent development in the advancement of cellular telephones are the development of projection systems which project images onto external surfaces.

Typically, such a projection is achieved by retrieving digital images stored in the memory of a cellular telephone, then inputting the digital image into a digital projector which then transmits the image to a projection lens on the external surface of the cellular telephone. The image can thus be projected onto an external viewing surface, such as wall or other similarly functioning flat surface which enables viewing of the image. The images can then be shared with other viewers, such as in a business environment where the image may by a chart containing business information, graphs and the like.

However, several distinct disadvantages exists with such systems. One particular disadvantage with these projectors is that the projection camera is permanently and fixedly attached to the phone. Thus if the display projection system malfunctions, the entire phone and projector must be replaced at considerable expense, since the phone and projector are integrated as a single unit into the phone. A second disadvantage arises if the phone needs to be upgraded or replaced due to antiquated software. In this instance, both the camera and the phone must be simultaneously replaced, adding considerable expense to the base purchase price of a new telephone. A third disadvantage arises from the fact that the camera is mounted in a fixed orientation relative to the phone. Thus moving or panning the projected image requires a manual movement of the phone with the user's hands, which can introduce shaking and instability into the projected image. A fourth disadvantage is that the projection cameras used on cellular phones are limited in the type of images they may project, typically projecting only flat two dimensional images on a flat viewing surface. This is often due to the fact that the width and thickness of the phone housing limits the space for the camera electronics. In most modern flat screen cellphones, there is only sufficient space in the phone to provide a rudimentary projection camera capable of only two dimensional projection on a two dimensional flat surface. The electronics necessary for three dimensional projection of more complex, holographic type images typically cannot fit within the thin profile of a cellular phone, given the additional lensing, transmission lights and control electronics required for such projection.

SUMMARY OF THE INVENTION

The present invention overcomes each of these four basic deficiencies which exist in the current art. More particularly, the invention achieves these objectives by providing a system comprising: a portable telephony device including a user interface and a photographic camera incorporated within a housing of said telephony device for recording images; an external framework encompassing said portable telephony device, said framework comprising: a telephony device supporting saddle; a first vertical support bar extending from one end of said saddle; a second vertical support bar extending from an opposite end of said saddle; a horizontal support bar extending between and fixedly connected to said first vertical support bar and said second vertical support bar; a projection camera slidably connected along said horizontal support bar, wherein said projection camera is configured to project three dimensional holographic images upon a surface object; focusing means associated with said projection camera so as to focus a projected three dimensional holographic image which is projected upon said surface object; first tilting means positioned on said horizontal support bar for tilting said projection camera along an axis passing through said horizontal support bar; second tilting means positioned on ends of said first vertical support bar and second vertical support bar for tilting said first and second vertical support bars along an axis passing through said support saddle; said projection camera further comprising measuring means for the measuring the position of a real world object relative to a three dimensional coordinate system and for positioning a three dimensional holographic image relative to a real world object.

DESCRIPTION OF THE DRAWINGS

FIG. 5 illustrates an alternate embodiment of the invention which deploys additional structural features for image control in accordance with the principles of the invention.

DETAILED DESCRIPTION OF THE INVENTION

Figure 1:
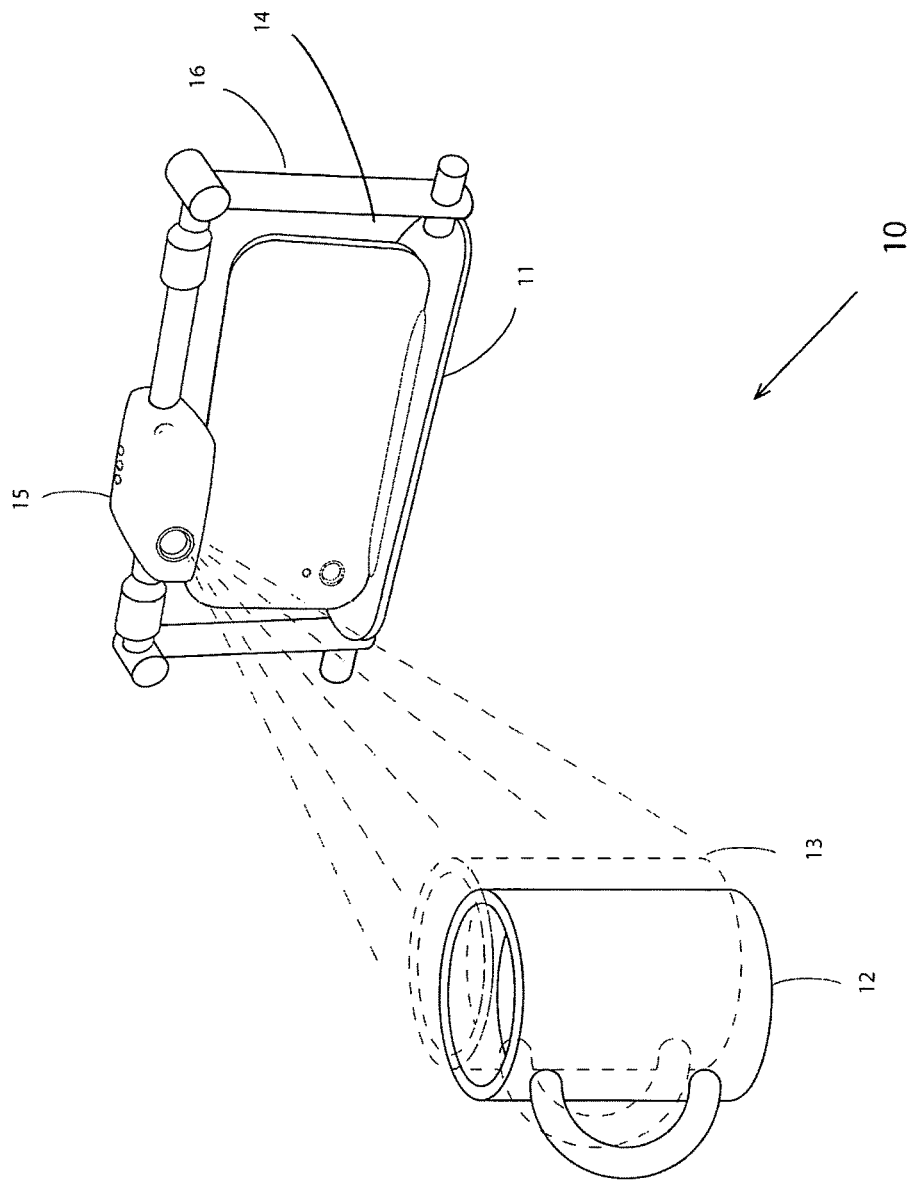
FIG. 1 illustrates the basic structures and principles of operation for the preferred embodiment of the invention.

FIG. 1 illustrates the basic structures and principles of operation for the preferred embodiment of the invention. The system 10 incorporates a projection system 11 and a physical object 12 (in this non-limiting example, the physical object is a coffee cup). A mobile telephone 14 with its own conventional internal camera (not shown) sits within an external framework 16. The external framework further includes a projection camera 15 capable of projecting a three dimensional holographic image 13. In one operational embodiment, the mobile telephone 14 first takes a photograph of the physical object 12. Using a conventional wired or wireless connection, the mobile telephone 14 then transmits the photograph to the projection camera 15 capable of projecting a three dimensional holographic image 13. The projection camera 15 can then project a three dimensional holographic image 13 that is over laid over the physical object 12. This has the effect of produce a three dimensional clone like double exposure overly which is illustrated in FIG. 1. This over laid holographic image 13 which covers the viewable surface of the physical object 12 establishes the basis for an augmented reality display, as the augmented display can provide additional information about the object or display the object in a different manner for artistic, aesthetic, educational or marketing purposes.

Figure 2:
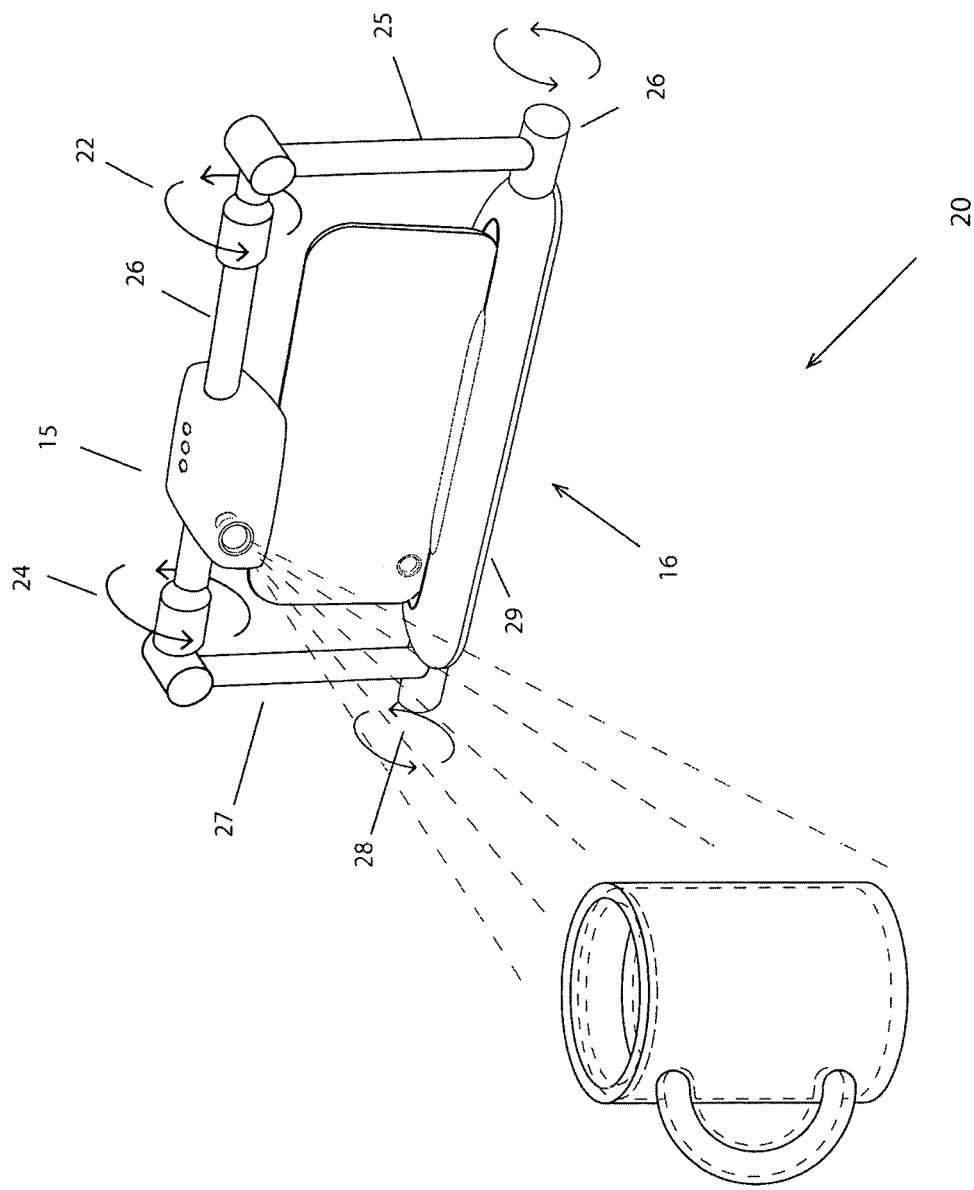
FIG. 2 illustrates in further detail, the basic structures associated with the preferred embodiment of the invention.

FIG. 2 illustrates in further detail, the basic structures associated with the preferred embodiment of the invention. In this instance, the system 20 is provided with an external framework 16 which supports the mobile telephone is relation to the projection camera 15. The external framework 16 is composed of vertical support bars 25 and 27, a horizontal support bar 26 and a phone supporting saddle 29. As seen in this figure, the mobile telephone is turned on its side so that it fits within the phone supporting saddle 29 along its longitudinal length.

This arrangement of an external framework supporting the projection camera is particularly advantageous in resolving the known deficiencies of the prior art. If the mobile phone were to malfunction or require upgrading, only the phone itself would need to be replaced. The projection camera 15 would remain intact and the user would not need to go to the expense of paying for a replacement of both the phone and the projection camera. A second advantage is that phones of various sizes, shapes and dimensions can be placed within the phone supporting saddle 29, thus allowing the projection camera to be used with any one of a variety of brands of cellular telephones. In an alternate embodiment (not shown), the vertical and horizontal support bars 25, 26 and 27 as well as the phone supporting saddle 29 could be telescoping in length, thus accommodating essentially any cellular phone having variety of lengths widths and geometry.

The system 20 is also provided with a first set of swivel knobs 22, 24 and a second set of swivel knobs 26, 28. The first set of swivel knobs 22, 24 permit the projection camera 15 to swivel relative to a longitudinal axis passing through the buttons 22, 24. The second set of swivel knobs 26, 28 permits the framework 16 to swivel relative to a longitudinal axis passing between the swivel knobs 26, 28. Additionally, the projection camera 15 may be configured to slide along its horizontal axis 26. In using such an arrangement, the projection camera 15 may: (1) swivel about its own horizontal axis; (2) swivel about the horizontal axis of the phone supporting saddle 29; (3) translate along its own horizontal axis. This arrangement allows the projected images to be properly aligned on to the physical object and hold the projected images steadily in place. This allows for panning and tilting of the projected image, without introducing the shaking or vibration that would be encountered if this movement were performed purely by hand.

Figure 3:
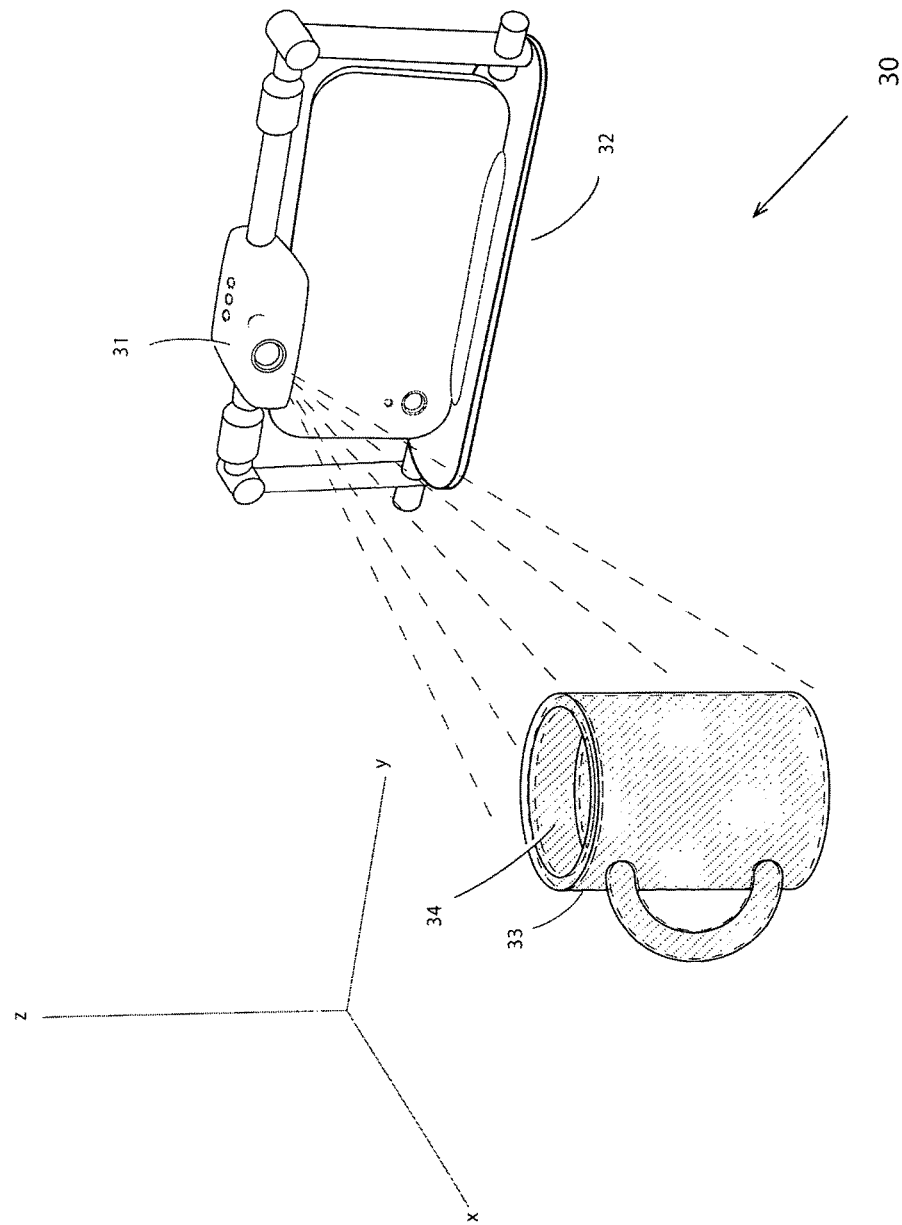
FIG. 3 illustrates a three dimensional mesh projection which is used for measuring the size of an object in accordance with the operation of the preferred embodiment of the invention.

FIG. 3 illustrates a system 30 in which a projection camera arrangement 32 is used for the purpose of measuring the dimensions of a real world object 33 (in this non-limiting example, the real world object is a coffee cup). The projection camera 31 of the projection camera arrangement 32 will project a three dimensional mesh of holographically projected laser lines on to the real world object 33. Outer surfaces and edges of the real world object will intersect the three dimensional mesh of holographically projected laser lines on to the real world object 33. An internal computer program operating within the projection camera 31 will then detect the positional coordinates of these points of intersection points along three independent axes. These are illustrated by the x, y and z axes in FIG. 3. By determining the points of intersection of the real world object on the holographically projected laser lines, a set of x,y,z coordinates can then be obtained for the real world object relative to the x,y,z coordinate axes. The exact location of the physical object within the x,y,z coordinate frame can then be ascertained by using this technique.

Using conventional algebraic and trigonometric techniques understood by a person of ordinary skill in the art, the differences between these x, y, z coordinates can be used to calculate the length, width, height, volume and circumference of the physical object 33. These calculations can be performed automatically and displayed to the user on the display screen of the phone, using the internal computer program operating within the projection camera 31. Alternatively, these calculations can be performed automatically and displayed to the user on the display screen of the phone, using stored applications on the phone or other stored algorithms operating within the phone. Furthermore, these calculations be used to determine where to place augmented reality images on the real world object, in a manner further described with respect to FIG. 4. The particular measurements cited herein are only examples of what can be achieved with this system, and the person of ordinary skill in the art would realize that other physical dimensions of the object could be obtained from the x,y,z coordinates beyond those listed herein.

Figure 4:
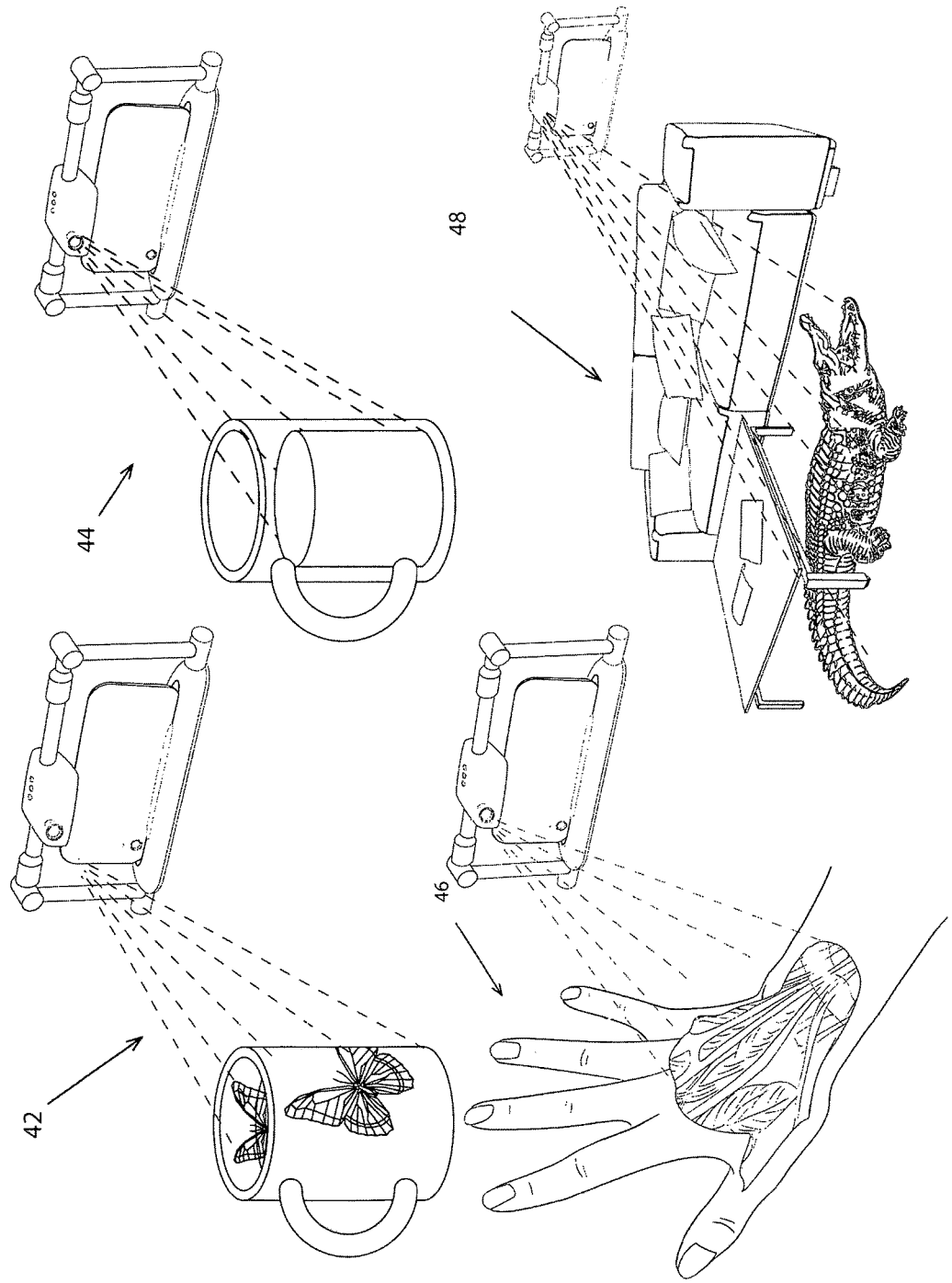
FIG. 4 illustrates examples of three dimensional augmented reality projections as overlaid on real world objects and demonstrate the various forms of information which can be provided in accordance with the principles of the invention.

FIG. 4 illustrates examples of three dimensional augmented reality projections as overlaid on real world objects and demonstrate the various forms of information which can be provided in accordance with the principles of the invention. In this application, the augmented reality projections 42, 44, 46 and 48 may utilize the x,y,z coordinate data and measurement data obtained in FIG. 3 in order to position and overlay the images on the real world objects. Additional adjustments to the overlaid images on the real objects can be achieved using the swivel knobs 22, 24, 26, 28 and sliding camera arrangement previously described in FIG. 2.

Returning again to FIG. 4, augmented reality projection 42 is illustrated in the form of an artistic image, such as a butterflies which are projected on the real world object in the form of a coffee mug. Augmented reality projection 44 may be an image that gives the user of an impression of the coffee mug having a transparent window in which a volume of coffee appears to be displayed through the transparent window. Such an arrangement can be used, for example, in marketing or advertising content. Augmented reality projection image 46 can be used for medical purposes or education, where images of joints and bones can be projected in three dimensions over the surface of a human hand. Augmented reality projection image 48 can be an image of a live animal projected on a surface. In this particular example, the image 48 can actually be a series of images arranged in a movie clip. Thus the image projected on the real world object can thus give the appearance of a live, moving, three dimensional animal appearing on the real world object or surface. Adjustments can be made to the lighting and opacity around the edges of the digital image to eliminate a square like appearance and enhance the three dimensional effect of each image. Graphic filters may also be deployed in real time to the digital content prior to projection in order to hide an infinite mirror effects may be produced during the image processing.

FIG. 5 illustrates an alternate embodiment of the invention which deploys additional structural features for image control in accordance with the principles of the invention. In particular, the system 20 includes a projection camera with an external housing 62 that includes a user adjustable focus wheel 64. As seen in the figure, the mobile phone includes a camera lens which can record images that serve as the basis for the augmented reality images. A hard wired (i.e. HDMI) or wireless connection may exists between the phone and projection camera in order to provide a line of communication between the two devices.

Alternatively, as indicated in FIG. 3, the projection camera 31 of the projection camera arrangement 32 will project a three dimensional mesh of holographically projected laser lines on to the real world object 33. Outer surfaces and edges of the real world object will intersect the three dimensional mesh of holographically projected laser lines on to the real world object 33. An internal computer program operating within the projection camera 31 will then detect the positional coordinates of these points of intersection points along three independent axes.

As indicated in FIGS. 2 and 5, a first set of swivel knobs 22, 24 and a second set of swivel knobs 26, 28. The first set of swivel knobs 22, 24 permit the projection camera 15 to swivel relative to a longitudinal axis passing through the buttons 22, 24. The second set of swivel knobs 26, 28 permits the framework 16 to swivel relative to a longitudinal axis passing between the swivel knobs 26, 28. Additionally, the projection camera 15 may be configured to slide along its horizontal axis 26. In using such an arrangement, the projection camera 15 may: (1) swivel along its own horizontal axis; (2) swivel along the horizontal axis of the phone supporting saddle 29; (3) translate along its own horizontal axis. This arrangement allows the projected images to be properly aligned on to the physical object and hold the projected images steadily in place.

Augmented projections open up a whole new world of experimental possibilities, be it simply seeing your wall in a different color paint job, making objects such as a coffee appear pixilated, seeing mapped out directions in real time projected outside your car as you drive, scanning your own body to see the anatomy beneath the skin, observe ads come to life on a cereal box.

The present invention further resolves the four distinct disadvantages that currently exist in the prior devices and system:

(1) Since the projection camera for augmented reality is not permanently and fixedly attached to the phone, any malfunction of the phone does not require the costly replacement of both the phone and the projection camera;

(2) If the phone needs to be upgraded or its internal software becomes antiquated, the user is not required to replace both the phone and the projection camera;

(3) In the present invention, the projection camera is not in a fixed position relative to the phone. The use of an external framework relative to the phone and position adjustment knobs for the projection camera means that the projection camera can be steadily panned or steered without the inherent shaking and vibration which occurs when such movement is performed purely by hand without mechanical guidance.

(4) In the present invention, the use of an external framework relative to the phone housing means that the size of the projection camera is not limited by the dimensions of the phone housing. The projection camera can essentially be of any size, provided that it fits upon the external framework. The phone housing length or thickness does not limit the projection camera in any way, allowing for the projection camera to carry additional electronics, systems, processors and software as needed for any particular application.

The invention has now been described in detail. However, it will be appreciate that certain changes and modifications may be made. Therefore, the scope and content of this invention are not limited by the foregoing description; rather, the scope and content are to be defined by the following claims.

What is claimed is:

1. A system for augmented viewing of real world objects comprising a portable telephony device including a user interface and a photographic camera incorporated within a housing of said telephony device for recording images; an external framework encompassing said portable telephony device, said framework including a telephony device supporting saddle; a first vertical support bar extending from one end of said saddle; a second vertical support bar extending from an opposite end of said saddle; a horizontal support bar extending between and fixedly connected to said first vertical support bar and said second vertical support bar; a projection camera slidably connected along said horizontal support bar, wherein said projection camera is configured to project three-dimensional augmented images upon a surface object.

2. A system for augmented viewing of real world objects comprising the apparatus of claim 1 wherein the telephony device includes software for providing three-dimensional imaging content; and stored augmented reality images that are selectively retrievable, the system comprising the steps of:
   a) generating three-dimensional imaging content of a real world object utilizing the photographic camera within the telephony device;
   b) transmitting the imaging content to the projection camera;
   c) retrieving and transmitting at least one of the stored augmented reality images to the projection camera; and
   d) projecting the augmented reality image in superimposed relationship with respect to the image of the real world object.

3. A system for augmented viewing of real world objects as claimed in claim 2 wherein the imaging content defines positional coordinates of the real world object.

4. A system for augmented viewing of real world objects as claimed in claim 3 wherein software within the projection camera detects the positional coordinates of the real world object.

5. A system for augmented viewing of real world objects as claimed in claim 2 wherein the horizontal support bar is rotationally displaceable about its horizontal axis for selectively positioning the projection camera to overlay the projected augmented reality image with respect to the image of the real world object.

6. A system for augmented viewing of real world objects as claimed in claim 2 wherein the projection camera is slideably displaceable along the horizontal axis of the horizontal support bar for overlaying the projected augmented reality image with respect to the image of the real world object.

7. A system for augmented viewing of real world objects as claimed in claim 2 wherein the vertical support bars are adjustably displaceable about the horizontal axis passing through the saddle for tilting the orientation of the projection camera to overlay the projected augmented reality image with respect to the image of the real world object.

8. A system for augmented viewing of real world objects as claimed in claim 1 wherein the telephony device is mobile phone.

9. A system for augmented viewing of real world objects as claimed in claim 8 wherein the mobile phone is selectively removable from the saddle.

\* \* \* \* \*